Figure 1:
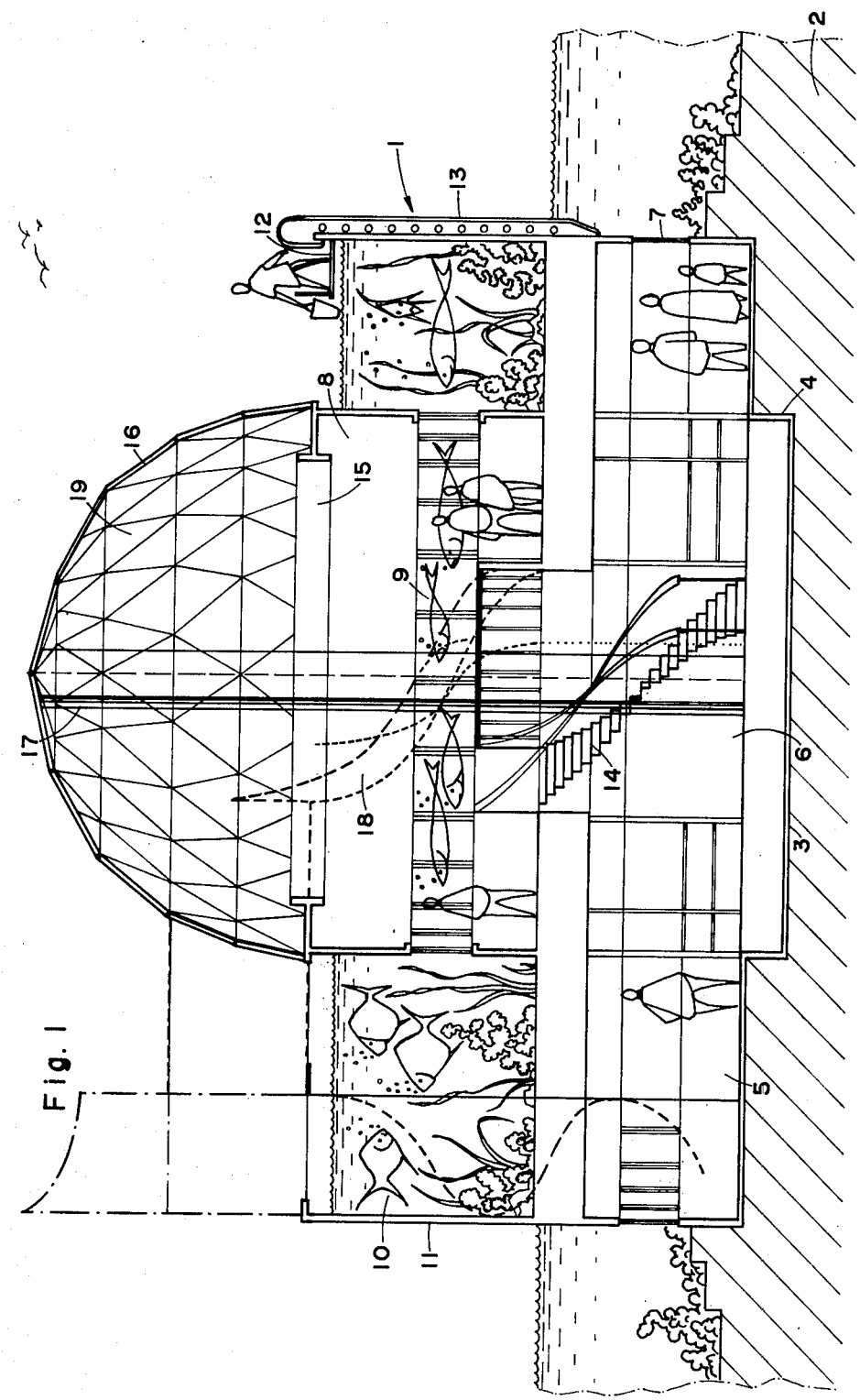

United States Patent [19]

Kahn

[11] 4,186,532
[45] Feb. 5, 1980

[54] UNDERWATER OBSERVATORY

[76] Inventor: Morris S. Kahn, P.O. Box 8388, St. Thomas, V.I.

[21] Appl. No.: 858,059

[22] Filed: Dec. 6, 1977

[30] Foreign Application Priority Data

Dec. 7, 1976 [IL] Israel ..................................... 51059
Dec. 8, 1976 [IL] Israel ..................................... 51069

[51] Int. Cl.² ........................................... B63B 35/00
[52] U.S. Cl. ................................. 52/169.1; 114/314; 114/66; 405/189; 405/194
[58] Field of Search ................ 52/169.1, 169.6; 61/69, 61/87, 86; 114/66, 16.4, 16.6, 16.7; 405/189, 194

[56] References Cited

U.S. PATENT DOCUMENTS

| 385,656 | 7/1888 | Belisle | 114/66 |
| 530,398 | 12/1894 | Cooper | 61/69 R |
| 902,898 | 11/1908 | Newhall | 52/173 |
| 1,223,515 | 4/1917 | Papanastasiou | 61/69 R |
| 3,240,186 | 3/1966 | Dobell | 114/66 |
| 3,254,621 | 6/1966 | White | 114/66 |
| 3,895,495 | 7/1975 | Akataki | 61/69 R |
| 4,058,945 | 11/1977 | Knapp | 61/69 R |

FOREIGN PATENT DOCUMENTS

| 1348284 | 11/1963 | France | 52/169.1 |
| 423864 | 5/1947 | Italy | 52/169.6 |
| 564843 | 5/1957 | Italy | 52/169.1 |
| 22335 | 3/1913 | United Kingdom | 114/66 |

Primary Examiner—James A. Leppink
Assistant Examiner—Henry E. Raduazo
Attorney, Agent, or Firm—Ladas, Parry, Von Gehr, Goldsmith & Deschamps

[57] ABSTRACT

An off-shore underwater observatory comprising a lower, submerged observation gallery fitted with at least one observation window and having a ceiling with an opening through which the observation gallery is accessible, and a body of water on top of the gallery such that the combined weight of the structure and the water exceeds the buoyancy. An annular skirt may depend from the ceiling in extension of said opening to a level which is below the head level of a person standing in the gallery, the upper edge(s) of the window(s) not exceeding the lower edge of said skirt.

9 Claims, 2 Drawing Figures

UNDERWATER OBSERVATORY

The present invention concerns an off-shore underwater observatory.

Off-shore under water observatories are gaining in popularity and they aim at making accessible to the public the observation of underwater life without the need for skin diving which as is well known can only be performed by fit and specially trained people.

For the construction of an underwater observatory means have to be provided to overcome the natural buoyancy of the hollow structure which the observatory is and to provide the required stability. In a known underwater observatory this problem is solved by providing a base plate which is piled into the bottom of the sea by means of a comparatively large number of relatively long piles. The observatory is anchored to the central portion of this base plate and around it an annular ballast is provided, e.g. scrap iron heaped in form of a several meters high tubular structure around the lower portion of the observatory.

This solution has a number of disadvantages: For one, the use of a large number of piles for piling of the base plate into the bottom of the sea is an expensive and protracted operation, the cost and difficulties increasing with the number and length of the piles which are required. Furthermore, in view of the fact that the lower portion of the observatory is surrounded by ballast the underwater observation gallery must be at a level above the top of the ballast. Assuming the height of the ballast to be 3 meters and that about the same height is at least required for the observation gallery, and bearing further in mind that the latter should be submerged a few meters, it becomes evident that such a structure requires a minimum depth of 10 meters which is a serious limitation where the off-shore shelf is shallow.

It is thus the object of the present invention to provide an improved structure for an off-shore underwater observatory in which the buoyancy problems are solved in a simpler manner and which can be situated in shallow water.

With the above object in view the invention provides an off-shore underwater observatory comprising a lower, submerged observation gallery fitted with at least an observation window and having a ceiling with an opening through which the observation gallery is accessible and a body of water on top of the gallery such that the combined weight of the structure and the water exceeds the buoyancy.

It is seen that in the observatory according to the invention the ballast required to overcome the buoyancy is located on top rather than underneath the observation gallery, and this enables to place the observatory in shallow waters. Furthermore, it becomes possible to prefabricate the entire structure before it is placed at its site.

In one embodiment of the invention the body of water is arranged as an aquarium and an adjacent upper gallery is provided from which the aquarium can be observed.

In accordance with the above embodiment the aquarium may be of essentially annular shape and surround said upper gallery.

As a rule there exists a considerable pressure drop across each window which on the outer side is exposed to the water pressure while on the inner side there prevails atmospheric pressure. Assuming the window to be in a depth of about 10 meters, the pressure drop across it is one atmosphere.

The considerable pressure drop across each window has the consequence that in case a window breaks water penetrates through the broken window into the underwater gallery at a high rate so that the entire gallery becomes flooded within a few minutes or even less with fatal consequences. With a view of providing a simple and effective solution to this problem an embodiment of the invention provides an off-shore underwater observatory of the kind specified comprising an annular skirt depending from the ceiling in extension of said opening to a level which is below the head level of a person standing in the gallery, the upper edge(s) of the window(s) not exceeding the lower edge of said skirt.

Preferably in this embodiment the underwater gallery is arranged centrosymmetrically around said opening and skirt.

When in the above embodiment a window breaks, water penetrates therethrough flooding the entire gallery and penetrating into the space below the skirt. When the water exceeds the lower edge of the skirt, an air pocket is formed in the gallery between the skirt and the outer wall portion above the window(s) so that the head of any trapped observer remains in the air pocket, enabling him to continue to breathe until he is saved.

Preferably in the above embodiment of the invention the floor region below the skirt is depressed to facilitate the passage from that region to the observation gallery.

If desired, means such as handles, grips or the like may be provided at the ceiling of the observatory which a trapped person may hold for better stability until he is rescued.

The invention further provides a prefabricated structure suitable for use as an off-shore underwater observatory, comprising an enclosure designed to serve as an underwater observation gallery and on top thereof means for holding a body of water. The water holding means may be designed to serve as an aquarium in which case the structure will comprise adjacent to said means a further enclosure designed to serve as an aquarium observatory. In such a case a circumferential wall may be provided surrounding said further enclosure and spaced therefrom so that water can be held between the wall and the enclosure.

The observatory according to the invention is placed on a base plate for which considerably less piling is required than for conventional observatories. If desired, the base plate may be stepped or otherwise recessed so as to cooperate with corresponding projection in the bottom of the observatory whereby any lateral displacement is prevented.

Figure 2:
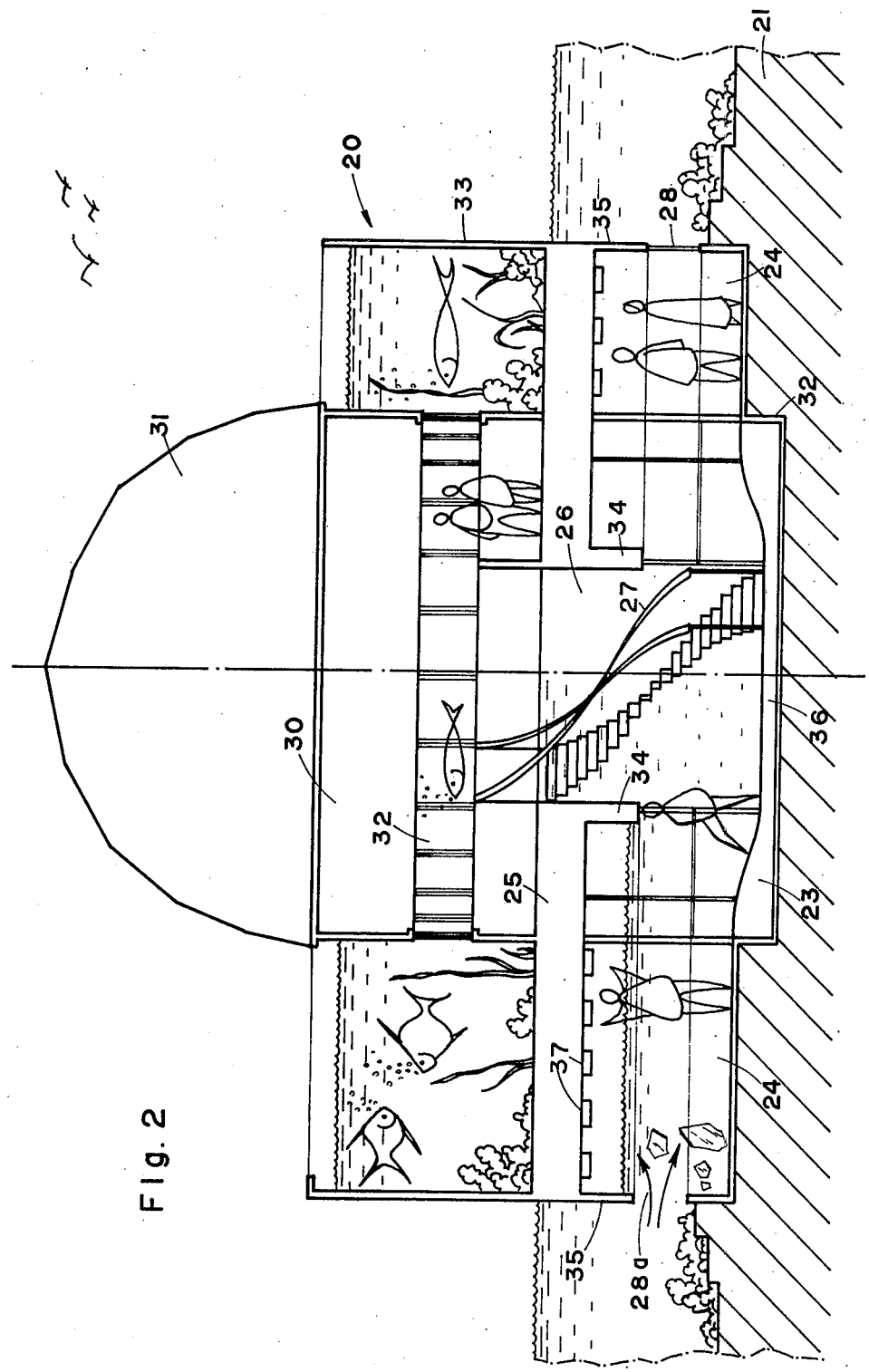

The invention is illustrated, by way of example only, in the accompanying drawing in which FIG. 1 is a cross-section through an observatory according to the invention and FIG. 2 is a cross-section showing another embodiment.

As shown in FIG. 1, an observatory 1 rests on a concrete base plate 2 anchored by means of piles (not shown). The base plate 2 comprises a central circular recess 3 adapted to receive a correspondingly shaped central portion 4 protruding from the bottom of the observatory. In this way any lateral displacement of the observatory is prevented.

The observatory 1 comprises a lower observation gallery 5 accessible from a central hall 6 and fitted with a plurality of windows 7. The observatory further comprises an upper observation gallery 8 fitted with a plurality of windows 9 and surrounded by an annular aquarium 10 formed between gallery 8 and a circumferential wall 11. Aquarium 10 is open from above and can be serviced from that direction. For this purpose it is fitted with a platform 12 from where the attendant can operate and which is accessible through a fixed ladder 13.

The upper gallery 8 is above sea level and is accessible by way of a bridge (not shown) which connects it with the shore. From that gallery a staircase 14 leads to the central hall 6 from where the observer can reach gallery 5. The upper gallery is covered by ceiling 15 and above it a dome structure 16. A pillar 17 serves for supporting the dome, staircases 12 and a further staircase 18 leading to enclosure 19 formed between ceiling 15 and dome 16. The latter is preferably translucent so that enclosure 19 may be utilised, e.g. as a restaurant.

In FIG. 2, the righthand side is shown in the dry and the lefthand side in the flooded state. Also in this case the observatory 20 rests on a concrete base plate 21 anchored in the sea bottom by means of piles (not shown). The base plate 21 comprises a central circular recess 22 adapted to receive a correspondingly shaped central portion 23 protruding from the bottom of the observatory. In this way any lateral displacement of the observatory is prevented.

The observatory comprises a lower observation gallery 24 covered by a ceiling 25 and accessible from a centrally located circular opening 26 in ceiling 25 by means of a staircase 27. Gallery 24 comprises a plurality of windows 28. The observatory further comprises an upper observation gallery 30 covered by a dome 31 and fitted with a plurality of windows 32. Gallery 30 is surrounded by an annular aquarium formed between gallery 30 and a circumferential wall 33. The aquarium is open from above and can be serviced from that direction.

Depending from ceiling 25 in extension of opening 26 is an annular skirt 34 co-extensive with an outer wall portion 35 above the upper edges of windows 28. The bottom section 36 underneath opening 26 and skirt 34 is depressed for convenient passage from that section into gallery 24.

Depending from ceiling 27 are a plurality of grips 37.

If one of the windows, e.g. window 28a on the lefthand side, breaks, water penetrates into the gallery and floods it up to the level of lower edge of skirt 34. Once that level is reached, an air pocket is formed between the skirt 34 and wall portion 35 and in this way a person trapped in the observation gallery 24 and continue to breathe until he is rescued. Until his rescue, the person can hold on to grip 37 for stability. In the central portion of the observatory water will rise until it reaches sea level.

A trained attendant can easily rescue a person trapped in the front gallery through staircase 27.

It is thus seen that the observatory according to FIG. 2 is so constructed that in case of flooding of the underwater gallery trapped persons can be saved.

I claim:

1. An off-shore underwater observatory comprising a lower, submerged observation gallery fitted with at least one observation window and having a ceiling with an opening through which the observation gallery is accessible, and a body of water acting as ballast on top of the gallery such that the combined weight of the structure and the water exceeds the buoyancy and holds the observatory in position without any anchorage, said body of water being arranged as an aquarium and an upper observation gallery being provided adjacent thereto.

2. An observatory according to claim 1, wherein the aquarium is of essentially annular shape and surrounds the upper observation gallery.

3. A prefabricated structure suitable for use as an off-shore underwater observatory comprising an enclosure designed to serve as an underwater observation gallery and on top of it means for holding a body of water acting as ballast, the arrangement being such that the observatory is held in position without any anchorage, said means for holding a body of water being designed to serve as an aquarium, and an enclosure being provided adjacent thereto adapted to serve as an aquarium observatory.

4. A structure according to claim 3, wherein said aquarium observatory is centrally located and a circumferential wall is provided in spaced relationship thereto so that water can be held between the wall and the observatory.

5. An off-shore underwater observatory comprising a lower, submerged observation gallery fitted with at least one observation window and having a ceiling with an opening through which the observation gallery is accessible, and a body of water on top of the gallery such that the combined weight of the structure and the water exceeds the buoyancy, an annular skirt depending from the ceiling in extension of said opening to a level which is below the head level of a person standing in the gallery, the upper edge or edges of the window or windows not exceeding the lower edge of said skirt.

6. An observatory according to claim 1, wherein the observation gallery is arranged centro-symmetrically around said opening and skirt.

7. An observatory according to claim 1, wherein means are provided on the ceiling of the underwater observatory which a person can grip for stability.

8. A prefabricated structure suitable for use use as an off-shore underwater observatory comprising an enclosure designed to serve as an underwater observation gallery having a ceiling and an access opening and on top of it means for holding a body of water, an annular skirt depending from the ceiling in extension of said opening to a level which is below the head level of a person standing in the gallery, the upper edge or edges of the window or windows not exceeding the lower edge of said skirt.

9. A structure according to claim 8 comprising a floor section below the shirt which is depressed to facilitate passage underneath the skirt.

* * * * *